United States Patent Office
3,734,746
Patented May 22, 1973

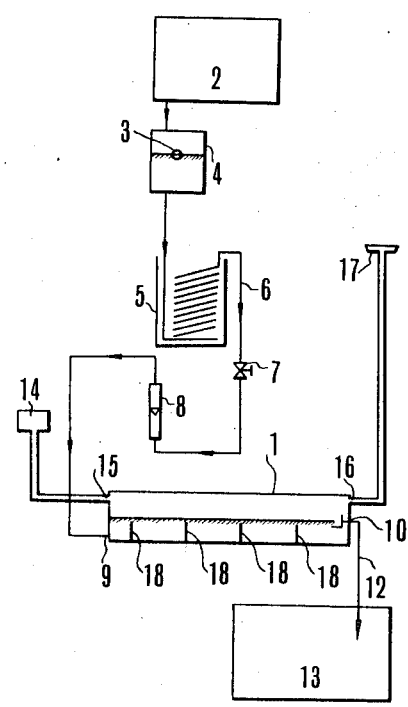
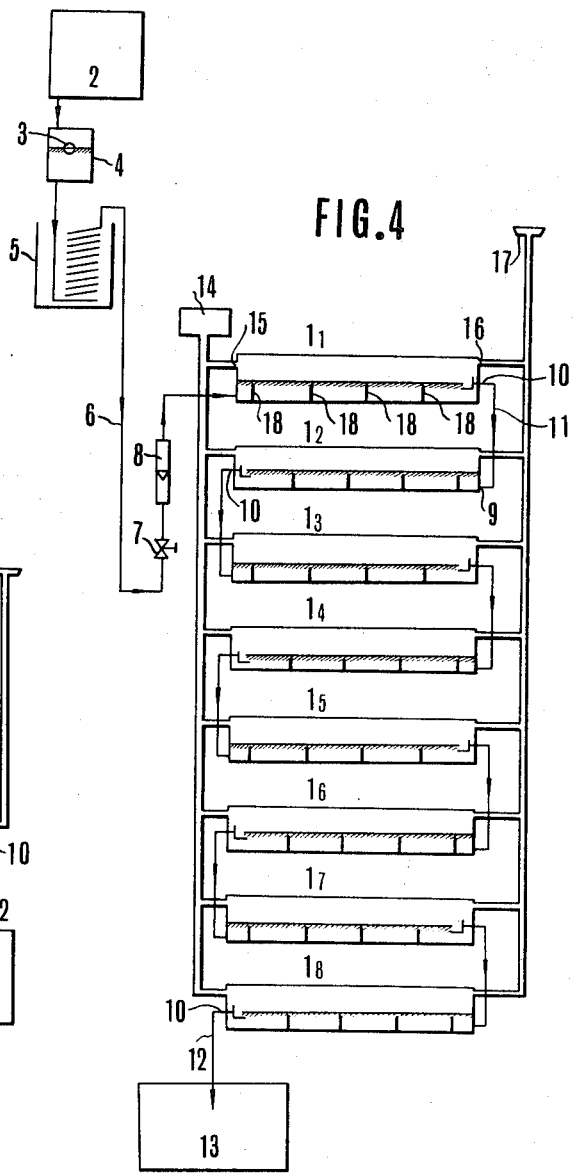

3,734,746
PROCESS FOR CONTINUOUS PRODUCTION OF VINEGAR BY SURFACE FERMENTATION
Yukio Yasui, Wataru Ikoga, Akihiko Mori, Kimio Date, and Tadaaki Adachi, Tokyo, Japan, assignors to Kewpie Jyozo Kabushiki Kaisha, Tokyo, Japan
Filed Mar. 3, 1971, Ser. No. 120,662
Claims priority, application Japan, Apr. 28, 1970, 45/35,951
Int. Cl. C12j 1/04
U.S. Cl. 99—147
6 Claims

ABSTRACT OF THE DISCLOSURE

A continuous process for the production of vinegar may be carried out in a single fermentation vessel or a plurality of fermentation vessels intercommunicated in series. In either case, the vessel or vessels are furnished with a plurality of flow regulating means thereby to ensure the rapid and uniform proceeding of the oxidative fermentation reaction in all parts of the vessel or vessels. Ethyl alcohol-containing liquid is firstly introduced into the above vessel or vessels and is inoculated with an overlayed layer of acetic acid bacteria which have been cultured in a suitably prepared nutrient medium and adapted to acidic broth. Succeedingly, fresh ethyl alcohol-containing liquid is continuously introduced into the single vessel or the first of the series-intercommunicated vessel or the first of the series-intercommunicated vessels, and the substantially fully fermented liquid is continuously withdrawn from the vessel or the last of the vessels at an equal rate to the rate of the introduction of the fresh ethyl alcohol-containing liquid.

BACKGROUND OF THE INVENTION

This invention relates generally to the production of vinegar, and more specifically to a new and improved process for the continuous production of vinegar by surface fermentation of ethyl alcohol-containing liquid.

There have been proposed a number of the so-called "continuous" processes, as distinguished from the "batch type" processes, for the rapid and efficient production of vinegar on a commercial basis. Among such continuous processes, the "quick vinegar fermentation process" (as disclosed for example in Japanese Pat. No. 244,905) comprises inoculating a substance (e.g. beech wood shavings or birch twigs) packed in a fermentation column with bacteria capable of oxidative conversion of alcohol to acetic acid (hereinafter referred to as "acetic acid bacteria"), passing ethyl alcohol-containing liquid down the column, and withdrawing part of the fermented effluent from the bottom of the column while the remainder of the effluent is again made to flow down the column together with fresh ethyl alcohol-containing liquid.

U.S. Pat. No. 2,997,424 discloses what may be designated as a "continuous submerged fermentation process," wherein fresh ethyl alcohol-containing liquid is continuously introduced into a fermentation vessel containing a substantially fully fermented solution, which is being continuously circulated and aerated, while an amount of the finished fermented solution equal to the amount of the aforesaid fresh ethyl alcohol-containing liquid being continuously introduced into the fermentation vessel is similarly being continuously withdrawn therefrom.

Furthermore, the "multistage surface fermentation process" (as disclosed for example in Japanese Pats. Nos. 244,906 and 562,821) proposes to form a layer of acetic acid bacteria on the surface of fermenting liquid in each of a plurality of fermentation vessels intercommunicated in series and to cause the fermenting liquid to flow so as not to break the layer of acetic acid bacteria overlayed thereupon.

The first mentioned "quick vinegar fermentation process," however, incurs too much expense for the substances to be packed in a fermentation zone and does not permit any break in a fermenting operation, once started, to the moment when the entire substance in use is to be replaced. Moreover, the rise in the acidity of fermenting liquid, or the acidification rate thereof, according to this prior process is as low as from about 0.4 to 0.5 percent per day. While a higher rate of acidification (2.2 percent a day) is exhibited by the second mentioned "continuous submerged fermentation process," in which vinegar production is made "continuous" in a condition immediately preceding the complete oxidation of ethyl alcohol-containing liquid, that figure is not sufficiently high compared with the acidification rates indicated by the various batch type processes. Although a fermenting operation in accordance with the same "continuous submerged fermentation process" can be started and broken as desired, this advantage is nearly offset by the considerable costs required in the installation and operation of the apparatus for use in carrying out the process.

An attempt to combine the advantages of the prior batch type static fermentation and multistage continuous fermentation has resulted in the last mentioned "multistage surface fermentation process," which provides for an easily controllable fermenting operation in uncomplex equipment, necessitating not too much expense in both installation and operation. While the rate of acidification according to this process (at about 0.8 to 1.0 percent per day) lies intermediate between the above specified acidification rates of the foregoing two continuous processes, the end product obtained is sufficiently flavorful and superior in other respects, too. For all these advantages, however, the "multistage surface fermentation process" has an inherent drawback with regard to the flow mode of fermenting liquid in its fermentation vessels.

An ideal mode of flow of fermenting liquid in a vessel may be represented by the so-called "plug flow," such that substantially no concentration gradient is existent in lateral directions of the flow course of the liquid but that a consecutive concentration gradient exists only in the direction of the flow. The prior fermentation vessels for use in carrying out the "multistage surface fermentation process" tend to cause such concentration gradients in lateral directions of the liquid flow, and this liquid flow itself is liable to be highly irregular, so that the uniform proceeding of the desired oxidative fermentation reaction of the liquid hardly can be expected. When only one of the fermentation vessels is used for vinegar production, therefore, part of the unfinished fermenting liquid is likely to find its way into the product withdrawn therefrom, thus deteriorating its flavor and substantially decreasing the yield of that vessel. It is for this reason that a plurality of such fermentation vessels are interconnected in series, with the provision of several bottlenecked passageways in between, to complete a single workable fermentation system. Hence the number of the fermentation vessels to be interconnected cannot be reduced arbitrarily to meet smaller installation or production requirements, nor can the size of each fermentation vessel be increased as desired.

The present invention has been made with a view to eliminating the foregoing disadvantages and inconveniences encountered in the practical application of the aforementioned prior art processes and, especially, of the "multistage surface fermentation process."

SUMMARY OF THE INVENTION

It is accordingly a primary object of the present invention to provide an improved continuous process for the rapid and efficient production of vinegar by surface fermentation of alcohol.

Another object of the invention is to provide an improved continuous process for the production of vinegar by means of a fermentation system which can be constructed and operated at low cost and which can be readily placed under automatic control for continuous vinegar production over extended periods of time.

Yet another object of the invention is to provide an improved continuous process for the production of vinegar capable of turning out equally superior products with either a single fermentation vessel or a plurality of fermentation vessels intercommunicated in series.

Still another object of the invention is to provide an improved continuous process for the production of vinegar according to which a fermentation vessel or vessels of almost any size or shape can be utilized to meet widely varied production and installation requirements.

Still a further object of the invention is to provide an improved continuous process for the production of vinegar according to which flow regulating means are provided inside a fermentation vessel or vessels thereby to facilitate localized liquid circulation therein and to ensure the uniform proceeding of the fermentation reaction in all parts of the vessel or vessels.

Yet a further object of the invention is to provide an improved continuous process for the production of vinegar according to which a layer of acetic acid bacteria overlayed upon fermenting liquid in a vessel is not contaminated with other undesired bacteria or organisms even after an extended period of time, nor is it disturbed to any appreciable degree as only the fermenting or fermented liquid therebelow flows out of the vessel.

In accordance with the present invention, in more specific aspects thereof, a fermentation vessel or vessels for use in carrying out the process of the invention may be either semicylindrical, rectangular or ellipsoidal in shape. Further, throughout this specification, the term "specific fermentation area $Sv$" is used to denote the ratio, $A/V$, of the area A in square meters of the surface of fermenting liquid in a vessel to the volume V in cubic meters of the fermenting liquid therein. It is necessary for obtaining the best results with the present process that ethyl alcohol-containing liquid be introduced into a fermentation vessel or vessels in such a quantity that the aforesaid specific fermentation area $Sv$ comes to not less than 5. This lower limit is set from our own experiments which have led to the discovery that the acidification rate of the alcohol-containing liquid is dependent upon the specific fermentation area $Sv$ presented by that liquid and the fermentation system.

Further objects and characteristic features of the present invention will be apparent from the following detailed description of the invention, together wih several examples thereof, when taken in conjunction with the accompanying drawings.

BRIEF DESCRIPTION OF THE DRAWINGS

In the drawings:

FIG. 3 is a schematic diagram showing the configuration of a fermentation system used for carrying out Example I of the process of the present invention; and FIG. 4 is a schematic diagram showing the configuration representative of fermentation systems used for carrying out Examples II, III and IV of the process of the present invention.

DETAILED DESCRIPTION OF THE INVENTION

In the following detailed process of the present invention, wherein alcohol-containing liquid is processed through quasi-tubular fermentation zones, it is of utmost importance for improved fermentation efficiency and improved yield to bring the flow of the fermenting liquid as close to the aforementioned plug flow as feasible. Theoretically, this goal is attainable by (1) increasing the flow rate of the fermenting liquid, (2) increasing the length of its flow course or (3) decreasing the cross-sectional size of the flow course. More practically, the solution (1) may be realized by increasing the aforesaid area A of fermentation surface, the solution (2) by increasing the length of a fermentation vessel or by interconnecting a plurality of fermentaion vessels, and the solution (3) by decreasing the cross-sectional size of a fermentation vessel or vessels. Of course, all these solutions are under limitations, both economically and technically. According to the present invention, however, such limitations are successfully circumvented by the provision of flow regulating means (such for example as those illustrated in FIGS. 2(A)–2(E) of the appended drawings) in a fermentation vessel or vessels thereby to cause localized liquid circulation therein and to substantially lengthen the total flow course of the fermenting liquid.

Figure 1:
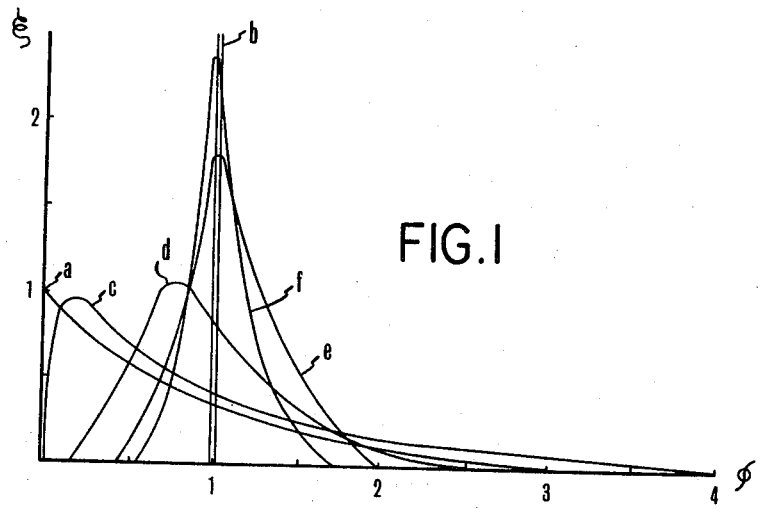
FIG. 1 is a graph plotted to show the residence time distributions, on a dimensionless basis, of fermenting liquid made to flow through different fermentation systems incorporating a single vessel or a plurality of vessels intercommunicated in series, with or without flow regulating means of the present invention.

Now, in order to ascertain the flow modes of the fermenting liquid in different vessel conditions, with or without the aforesaid flow regulating means of the invention, the present inventors have conducted a series of experiments in which colored liquid as traced was introduced in the form of pulses into various configurations of fermentation vessels (to be described in detail) and the tracer concentrations were detected at the outlets thereof. The results or the so-called "delta responses" are plotted in the graph of FIG. 1, in which the axis of abscissas $\phi$ represents dimensionless time $\theta/\theta_r$ where $\theta$ is the time elapsed after tracer introduction and $\theta_r$ is the mean residence time of the tracer in a fermentation system, and the axis of ordinates $\xi$ represents dimensionless concentration $CV/CoVo$ where $Vo$ is the volume of tracer introduced, $Co$ is the concentration thereof, V is the total volume of liquid in a fermentation system and C is the tracer concentration as detected at the outlet. Among the curves plotted in the graph, the curve $a$ is exhibited by a perfectly stirred tank employed in the present experiments by way of illustration; the curve $b$ represents the aforementioned plug flow; the curve $c$ is exhibited by a single surface fermentation vessel without the flow regulating means of the invention; the curve $d$ by a single surface fermentation vessel with the flow regulating means (as described in Example I of the present invention); the curve $e$ by a system of three series-intercommunicated surface fermentation vessels with the flow regulating means; and the curve $f$ by a system of eight series-intercommunicated surface fermentation vessels with the flow regulating means (as described in Example II of the invention). Since the plug flow represented by the curve $b$ is obtainable by interconnecting an infinite number of the aforementioned perfectly stirred tanks in series, connection of a number of those tanks will provide a practical model of a substantially tubular fermentation zone. According to this modelling scheme, the above curve $a$ is exhibited by one such tank, the curve $b$ by an infinite number of such tanks intercommunicated in series, the curve $c$ by three such tanks intercommunicated in series, the curve *d* by six such tanks intercommunicated in series, the curve *e* by 14 such tanks intercommunicated in series and the curve *f* by 37 such tanks intercommunicated in series.

Thus, only by the provision of the flow regulating means in accordance with the present invention, a single or only a few series-intercommunicated fermentation vessels ensure the flow of fermenting liquid that comes so close to the plug flow as to be made possible only by a much greater number of series-intercommunicated fermentation vessels without provision of the flow regulating means. It will also be obvious that liquid flow far closer to the plug flow is obtainable if such a great number of series-intercommunicated vessels are equipped with the flow regulating means of the invention, and further that a continuous fermenting operation can be effected satisfactorily even in a single fermentation vessel if, again, that vessel is equipped with the flow regulating means of the invention. The resultantly uniformized proceeding of the oxidative fermentation reaction in all parts of the vessel or vessels promises the production of vinegar greatly stabilized in quality.

It is noteworthy that the continuous surface fermentation process carried out in one experimental fermentation system constructed in accordance with the teachings of the present invention exhibited an acidification rate of 3.5 percent per day, with the residence time of the fermenting liquid in the system at as short as 20 hours. Compared with the prior art, this acidification rate is seven times that of the "quick vinegar fermentation process," three and one half times that of the prior "multistage surface fermentation process" and one and a half times that of the "continuous submerged fermentation process."

The process of the present invention will now be described in more specific aspects according to several examples which are meant only to illustrate and not to limit the invention.

EXAMPLE I

Figures 2A, 2C:
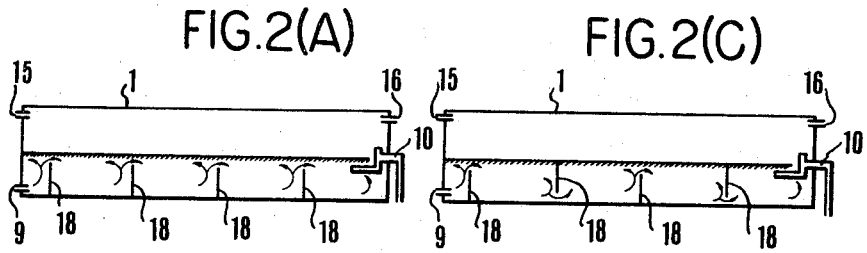
FIGS. 2(A) and 2(B) are a schematic vertical sectional view and schematic top view respectively of a fermentation vessel used in the hereinafter described Examples I and II of the process of the present invention, FIGS. 2(C) and 2(D) being similar views respectively of a fermentation vessel used in Example III, and FIGS. 2(E) and 2(F) being similar views respectively of a fermentation vessel used in Example IV.
Figures 2B, 2D:
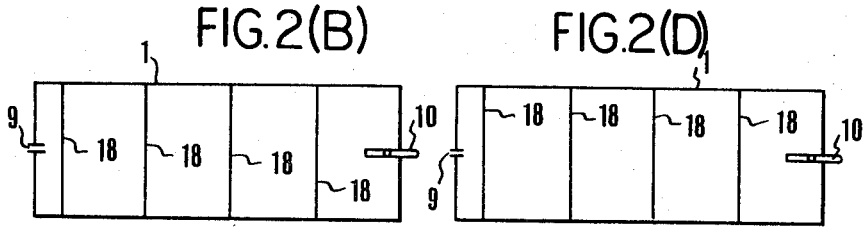

As illustrated in FIGS. 2(A) and 2(B), four flow regulating means 18 were installed in a fermentation vessel 1 (closed then at its top) having a length of about 4 meters, a width of about 0.75 meter and a depth of about 0.12 meter, one of the four flow regulating means 18 being placed close to a liquid inlet 9 of the vessel 1 while the other three were placed at about equal intervals. The lower ends of all the four flow regulating means 18 were made to contact the bottom of the vessel 1. Fermenting liquid is to be contained in this vessel 1 to a depth of about 0.05 meter, or about 0.003 meter higher than the tops of the flow regulating means 18, the liquid level therein being defined by the outlet of the vessel to be described later in greater detail. In this manner, only part of the liquid introduced continuously into this vessel 1 will go over the flow regulating means 18, whereas the rest of the liquid flows countercurrently in each of the five chambers partitioned by the four flow regulating means 18, thereby to minimize concentration gradients in each of the chambers. As mentioned already, the flow mode of the liquid throughout this vessel 1 (represented by the curve *d* in the graph of FIG. 1) is substantially equivalent to that exhibited by a series intercommunication of six perfectly stirred tanks.

For carrying out the continuous surface fermentation process of the present invention, in accordance with the first example thereof, a fermentation system including the above described vessel 1 was configured as illustrated schematically in FIG. 3. Ethyl alcohol-containing liquid (e.g. denatured malt liquor) was firstly introduced into the vessel 1 (with the specific fermentation area $S_V$ at 20) and was inoculated with a layer of acetic acid bacteria, which had been cultured in a suitably prepared nutrient medium and adapted to acidic broth, overlaid thereupon. As the oxidative fermentation reaction of this ethyl alcohol-containing liquid in the vessel 1 drew near to completion, fresh ethyl alcohol-containing liquid was introduced continuously into the same vessel 1 from its supply in a tank 2 via another tank 4 in which the liquid level was kept constant by means of a trap 3, preheating tank 5, condit 6, solenoid valve 7, flowmeter 8 and inlet 9, while being kept at a temperature ranging between about 28 and 30° C. Following this continuous introduction of fresh ethyl alcohol-containing liquid into the vessel 1, the finished fermented liquid was continuously withdrawn therefrom by overflow into a tank 13 via an outlet 10 and a conduit 12.

This outlet 10 of the vessel 1, like indeed the outlets of other fermentation vessels used in the hereinafter described examples of the process of the invention, is comprised of a conduit portion leading out of the closed vessel and a substantially L-shaped suction pipe portion (which may be perforated) installed inside of the vessel, as seen for example in FIG. 2(A). The end of the vertical part of the substantially L-shaped suction pipe portion is open to the ventilated air within the vessel, and the conduit portion is connected to that point of the mentioned vertical part which defines the liquid level of the vessel. In this manner, the layer of the acetic acid bacteria overlaid upon the fermenting liquid is neither contaminated with other bacteria or organisms over an extended period of time nor disturbed to any appreciable degree by the overflow of the liquid out of the vessel.

The fermenting liquid within the vessel 1, moreover, was covered by a stream of atmospheric air supplied through a filter 14 and an air inlet 15, whereas the exhaust gases were made to escape from an air outlet 16 and a passageway 17. During the continuous fermenting operation, the exterior of the vessel 1 was kept in a temperature range of from about 28 to 29° C., while the temperature of the fermenting liquid itself therein was kept elevated to 35° C. or thereabouts due to the exothermic acidification reaction caused by the acetic acid bacteria.

The fermenting liquid, initially having an acidity of 2 percent and an alcohol concentration of 3.5 percent, was introduced into the vessel 1 at such a feed rate that approximately 0.25 percent alcohol was left in the effluent. Thus a continuous fermenting operation was carried out for a period of one month, exhibiting the stabilized figures of 5 percent for the acidity of the effluent, 6.5 l./hr. for the volumetric feed rate of the fermenting liquid into the vessel, and 23 hours for the residence time of the fermenting liquid in the vessel. The mean acidification rate over the period was 3.12 percent per day, and the mean fermentation efficiency 95.5 percent. Upon removal of the thickened layer of the acetic acid bacteria from the vessel 1, no evidence was found of vessel contamination with other undesired bacteria or organisms.

EXAMPLE II

The fermentation vessel illustrated in FIGS. 2(A) and 2(B) and used in the foregoing Example I was series connected with seven other identical vessels as in FIG. 4. The flow mode of fermenting liquid throughout these eight intercommunicated vessels $1_1$ through $1_8$ is represented by the curve *f* in the graph of FIG. 1, which will otherwise be exhibited by a system of as many as thirty-seven perfectly stirred tanks intercommunicated in series, as mentioned already.

All the eight vessels $1_1$ through $1_8$ were charged with ethyl alcohol-containing liquid (e.g. denatured malt liquor) and were then successively inoculated with a layer of acetic acid bacteria (cultured beforehand in a suitably prepared nutrient medium and adapted to acidic broth) in the reversed order of from vessel $1_8$ on to vessel $1_1$, at such time intervals that the fermentation reaction in the vessel $1_1$ started up just at the instant when the fermentation reaction in the vessel $1_8$ drew near to completion. Then fresh ethyl alcohol-containing liquid was introduced continuously into the first vessel $1_1$ from its supply in a tank 2 via another tank 4 in which the liquid level was kept constant by means of a trap 3, preheating tank 5, conduit 6, solenoid valve 7, flowmeter 8 and inlet 9, while being kept at a temperature ranging between about 28 and 30° C. The fermenting liquid in the first vessel $1_1$ flowed continuously out of an outlet 10 thereof designed to keep the liquid therein at a desired constant level and, via a conduit 11, into the second vessel $1_2$ from its inlet 9. The fermenting liquid in this second vessel $1_2$ then flowed continuously out of its outlet 10, also designed to keep the liquid therein at a desired constant level, at an equal rate to the rate of the introduction of the liquid from the first vessel $1_1$. In this manner, the fermenting liquid was made to flow successively down the vessels, finally to flow out of the outlet 10 of the eighth vessel $1_8$ as finished fermented liquid into a tank 13 through a conduit 12. During the continuous fermenting operation, the exteriors of the vessels $1_1$ through $1_8$ were maintained in a temperature range of from about 28 to 29° C., whereas the temperature of the fermenting liquid itself therein was kept elevated to 35° C. or thereabouts due to the exothermic reaction caused by the acetic acid bacteria. The fermenting liquid within these vessels was covered with a stream of atmospheric air fed from a filter 14 and air inlet 15, and the exhaust gases were made to escape from an air outlet 16 and passageway 17.

The ethyl alcohol-containing liquid, having an initial acidity of 2 percent and alcohol concentration of 3.5 percent, was introduced into the vessels at such a feed rate that about 0.26 percent alcohol was left in the effluent therefrom. A continuous fermenting operation in this manner was carried out for a one-month period, exhibiting the stabilized figures of 5 percent for the acidity of the effluent, 56.3 l./hr. for the volumetric feed rate of the liquid into the vessels, and 21.3 hours for the mean residence time of the liquid in those eight vessels. The mean acidification rate exhibited over the period was 3.38 percent per day, and the mean acidification efficiency 95.8 percent. The thickened layers of the acetic acid bacteria removed from the vessels showed no evidence of vessel contamination with other undesired bacteria or organisms.

EXAMPLE III

As illustrated in FIGS. 2(C) and 2(D), four flow regulating means 18 were installed in a fermentation vessel 1 (closed then at its top) having a length of about 4 meters, a width of about 0.75 meter and a depth of about 0.12 meter (to contain fermenting liquid to a depth of about 0.05 meter), one of the four flow regulating means 18 being placed close to a liquid inlet 9 of the vessel 1 and the remaining three at about equal intervals. The first and third flow regulating means as counted from the inlet side were installed with their tops approximately 3 millimeters lower than the liquid level while their lower ends were made to contact the bottom of the vessel, and the second and fourth flow regulating means were installed with their lower ends approximately 3 millimeters higher than the bottom of the vessel while their tops were substantially on the level with the liquid surface. This and seven other identically prepared fermentation vessels were interconnected in series as illustrated in FIG. 4. As mentioned already, the flow mode of fermenting liquid throughout these eight vessels $1_1$ through $1_8$ is represented approximately by the curve *f* in the graph of FIG. 1, being equivalent to that exhibited by a system of thirty-six perfectly stirred tanks intercommunicated in series.

A continuous fermenting operation in this fermentation system was carried out for a one-month period in substantial accordance with the details set forth in the foregoing Example II. The finished fermented liquid withdrawn from the system had an alcohol concentration of about 0.25 percent and an acidity of about 5 percent. The mean volumetric feed rate over the period was about 56.4 liters per hour, the mean residence time of the fermenting liquid in the vessels about 21.6 hours, the mean acidification rate about 3.34 percent per day, and the mean fermentation efficiency about 95.5 percent. The thickened layers of the acetic acid bacteria removed from the vessels betrayed no evidence of vessel contamination with other undesired bacteria or organisms.

EXAMPLE IV

Figures 2E, 2F:
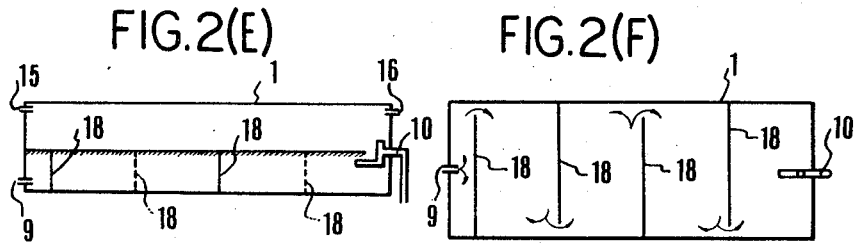

As illustrated in FIGS. 2(E) and 2(F), four flow regulating means 18 were installed in a fermentation vessel 1 (closed then at its top) having a length of about 4 meters, a width of about 0.75 meter and a depth of about 0.12 meter (to contain fermenting liquid to a depth of about 0.05 meter), the flow regulating means 18 being all of the same height as the liquid level in the vessel 1 and one of them being placed close to a liquid inlet 9 while the others were disposed at about equal intervals. As shown in the drawings, the first and third flow regulating means as counted from the inlet side were installed with a spacing of about 5 centimeters respectively between their ends and one of the sides of the vessel 1, whereas the second and fourth flow regulating means were installed with the same spacing respectively between their ends and the other side of the vessel 1. This and seven other identically prepared fermentation vessels were interconnected in series as illustrated in FIG. 4. The flow mode of fermenting liquid throughout these eight vessels $1_1$ through $1_8$ is equivalent to that exhibited by a system of twenty-five perfectly stirred tanks intercommunicated in series.

A continuous fermenting operation in this fermentation system was carried out for a one-month period in substantial accordance with the details set forth in the above Example II, to obtain finished fermented liquid having an alcohol concentration of about 0.22 percent and an acidity of about 5 percent. The mean volumetric feel rate over the period was 54.1 liters per hour, the mean residence time of the fermenting liquid in the vessels about 22.2 hours, the mean acidification are about 3.24 percent perday, and the mean fermentation efficiency about 94.7 percent. The thickened layers of the acetic acid bacteria removed from those vessels also betrayed no evidence of vessel contamination with other undesired bacteria or organisms.

Although the process of the present invention has been shown and described in the foregoing in accordance with several particular examples thereof, it is to be understood that the invention itself is not to be restricted thereby but includes obvious and reasonable equivalents within its scope defined by the appended claims.

We claim:

1. A process for the continuous production of vinegar which comprises the steps of maintaining a surface layer of acetic acid bacteria upon a body of ethyl alcohol-containing liquid in a fermentation vessel, continuously introducing fresh alcohol-containing liquid into such body of liquid below the layer of bacteria, continuously withdrawing liquid from such body of liquid below the layer of bacteria, at a point remote from the point of introduction of fresh liquid, and passing filtered air through the vessel above the layer of bacteria, wherein the improvement comprises the step of causing the liquid to flow from the point of introduction to the point of withdrawal in a circuitous path without disturbing the surface layer of bacteria, thereby greatly increasing the acidification rate, and stabilizing the quality of the product.

2. A process according to claim 1 wherein the liquid is caused to flow in a horizontally circuitous path.

3. A process according to claim 1 wherein the liquid is caused to flow in a vertically circuitous path, passing at a plurality of points just below the layer of bacteria.

4. A process according to claim 1 wherein the liquid is caused to flow in the same manner through a plurality of fermentation vessels in series.

5. A process for the continuous production of vinegar which comprises the steps of maintaining a surface layer of acetic acid bacteria upon a body of ethy alcohol-containing liquid in a fermentation vessel, continuously introducing fresh alcohol-containing liquid into such body of liquid below the layer of bacteria, continuously withdrawing liquid from such body of liquid below the layer of bacteria, at a point remote from the point of introduction of fresh liquid, and passing filtered air through the vessel above the layer of bacteria, wherein the improvement comprises the step of causing the liquid to flow from the point of introduction to the point of withdrawal in a path which is restricted at a plurality of points to force all of the liquid to pass just below the surface layer of bacteria without disturbing the surface layer of bacteria, thereby greatly increasing the acidification rate, and stabilizing the quality of the product.

6. A process according to claim 5 wherein the liquid is caused to flow in the same manner through a plurality of fermentation vessels in series.

References Cited

UNITED STATES PATENTS

| | | | |
|---|---|---|---|
| 2,997,424 | 8/1961 | Mayer | 195—49 |

FOREIGN PATENTS

| | | | |
|---|---|---|---|
| 982,923 | 2/1965 | Great Britain | 195—141 |
| 562,821 | 1969 | Japan | 99—47 |

OTHER REFERENCES

Samuel Prescott and Cecil Dunn, "Industrial Microbiology," 1959, 3rd ed., publisher—McGraw-Hill Book Co. Inc., pp. 436–437.

A. LOUIS MONACELL, Primary Examiner

R. J. WARDEN, Assistant Examiner

U.S. Cl. X.R.

195—141